No. 718,830. PATENTED JAN. 20, 1903.
W. W. DOOLITTLE.
PIPE TRUING MECHANISM.
APPLICATION FILED OCT. 5, 1901.
NO MODEL. 5 SHEETS—SHEET 2.

No. 718,830. PATENTED JAN. 20, 1903.
W. W. DOOLITTLE.
PIPE TRUING MECHANISM.
APPLICATION FILED OCT. 5, 1901.
NO MODEL. 5 SHEETS—SHEET 3.

No. 718,830. PATENTED JAN. 20, 1903.
W. W. DOOLITTLE.
PIPE TRUING MECHANISM.
APPLICATION FILED OCT. 5, 1901.

NO MODEL. 5 SHEETS—SHEET 4.

Witnesses: Inventor:
William W. Doolittle
By Paul Synnestvedt
Att'y.

No. 718,830. PATENTED JAN. 20, 1903.
W. W. DOOLITTLE.
PIPE TRUING MECHANISM.
APPLICATION FILED OCT. 5, 1901.
NO MODEL. 5 SHEETS—SHEET 5.

Witnesses: Inventor:
William W. Doolittle
By Paul Synnestvedt
Att'y.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

PIPE-TRUING MECHANISM.

SPECIFICATION forming part of Letters Patent No. 718,830, dated January 20, 1903.

Application filed October 5, 1901. Serial No. 77,660. (No model.)

*To all whom it may concern:*

Be it known that I, WILLIAM WALLACE DOOLITTLE, a citizen of the United States of America, and a resident of Chicago, county of Cook, and State of Illinois, have invented certain new and useful Improvements in Pipe-Truing Mechanism, of which the following, taken in connection with the accompanying drawings, is a specification.

This invention has reference to mechanism to be applied in truing or correcting irregularities in pipes or tubes preparatory to machining or threading the same.

The first object of my invention is to provide a device of the class referred to which can be applied to any ordinary form of pipe-threading machine and which can be readily moved into and out of position and will when in operation perform its work effectively and with a minimum expenditure of time and trouble.

Another object of my invention is the provision of a pipe-truing machine which will at the same time that it corrects unevennesses in the cylindrical formation of the ends of the pipe operate upon the same to shape it somewhat into a form better adapted to take a thread than the pipe is ordinarily when simply cut off and not specially shaped before the threading operation.

Still another object of my invention is to provide a mechanism for truing the ends of pipe and tubes which will prepare the same for taking a thread without the necessity of first cutting or machining the end, so as to form the same of a somewhat tapered form.

The above, as well as such other objects as may hereinafter appear, I attain by means of a construction which I have illustrated in preferred form in the accompanying drawings, in which—

Figure 1:
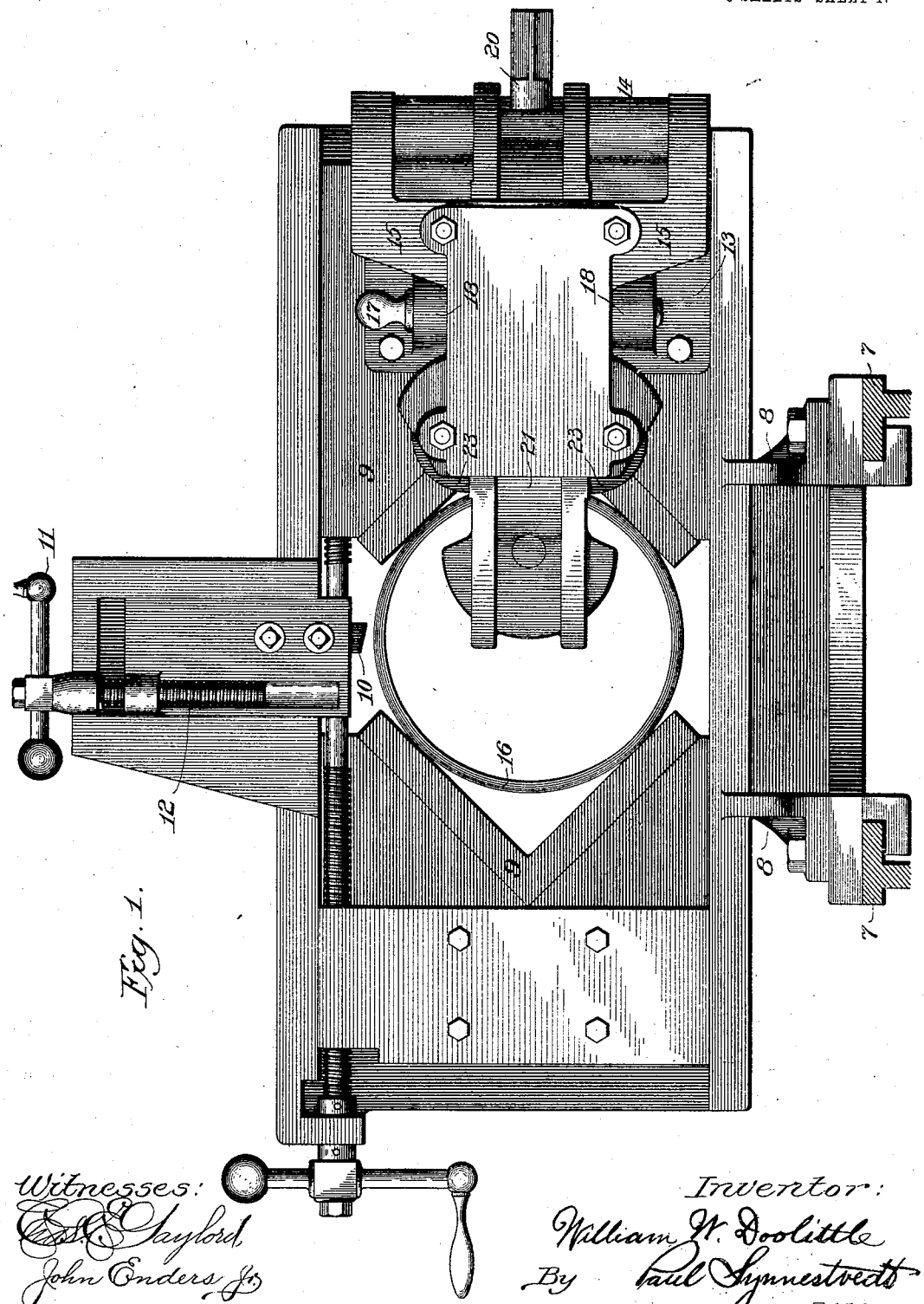
Figure 2:
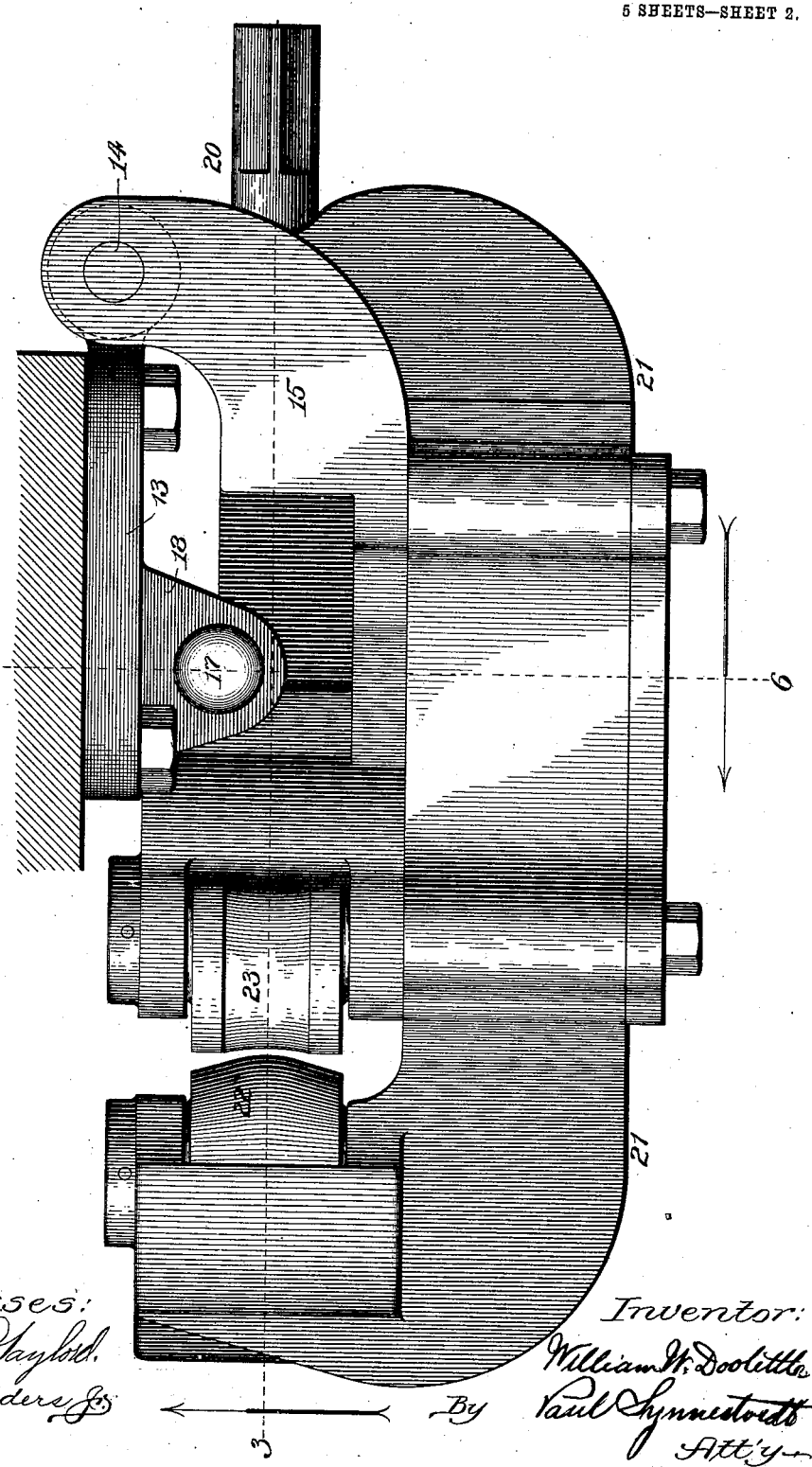
Figure 3:
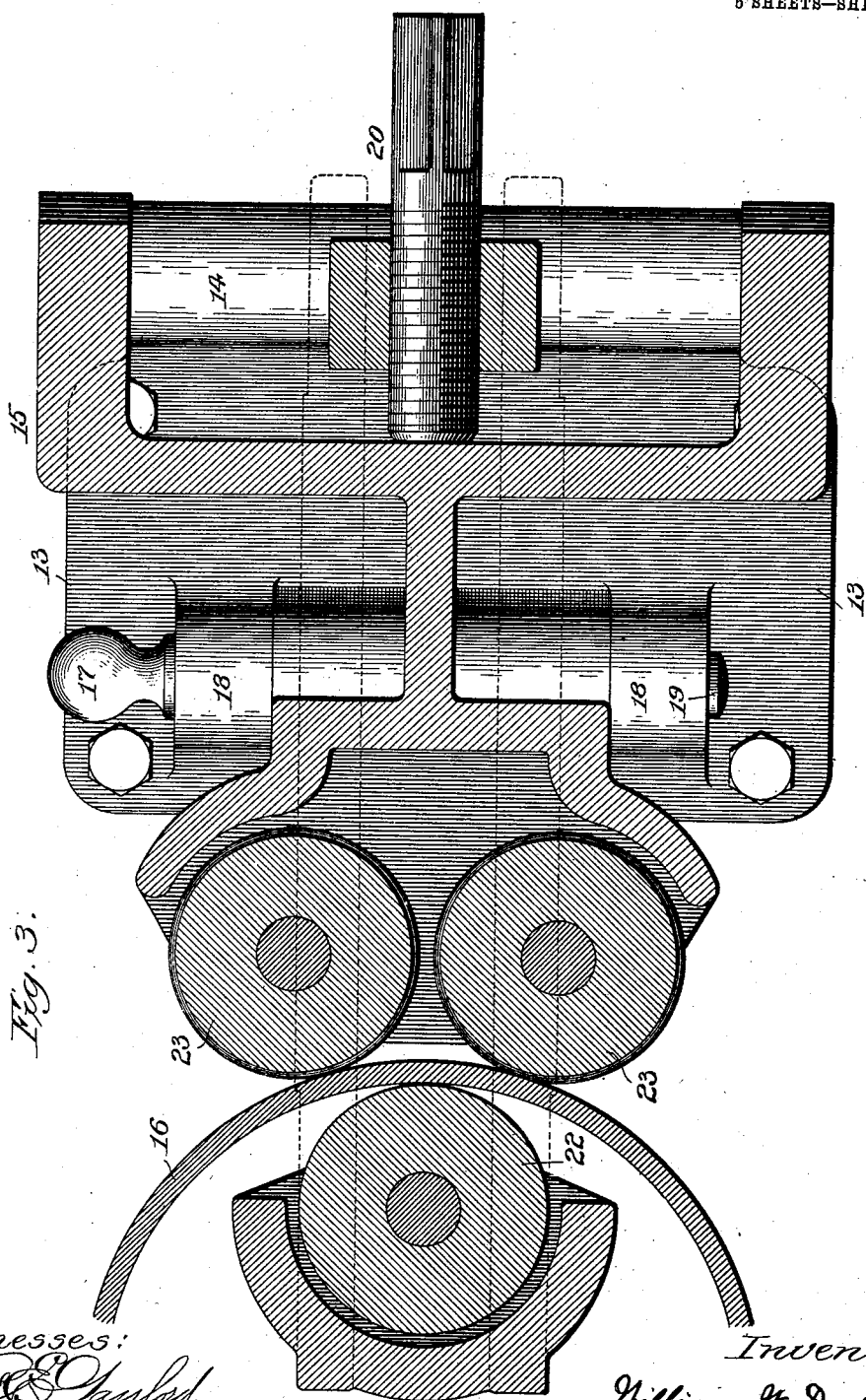
Figure 4:
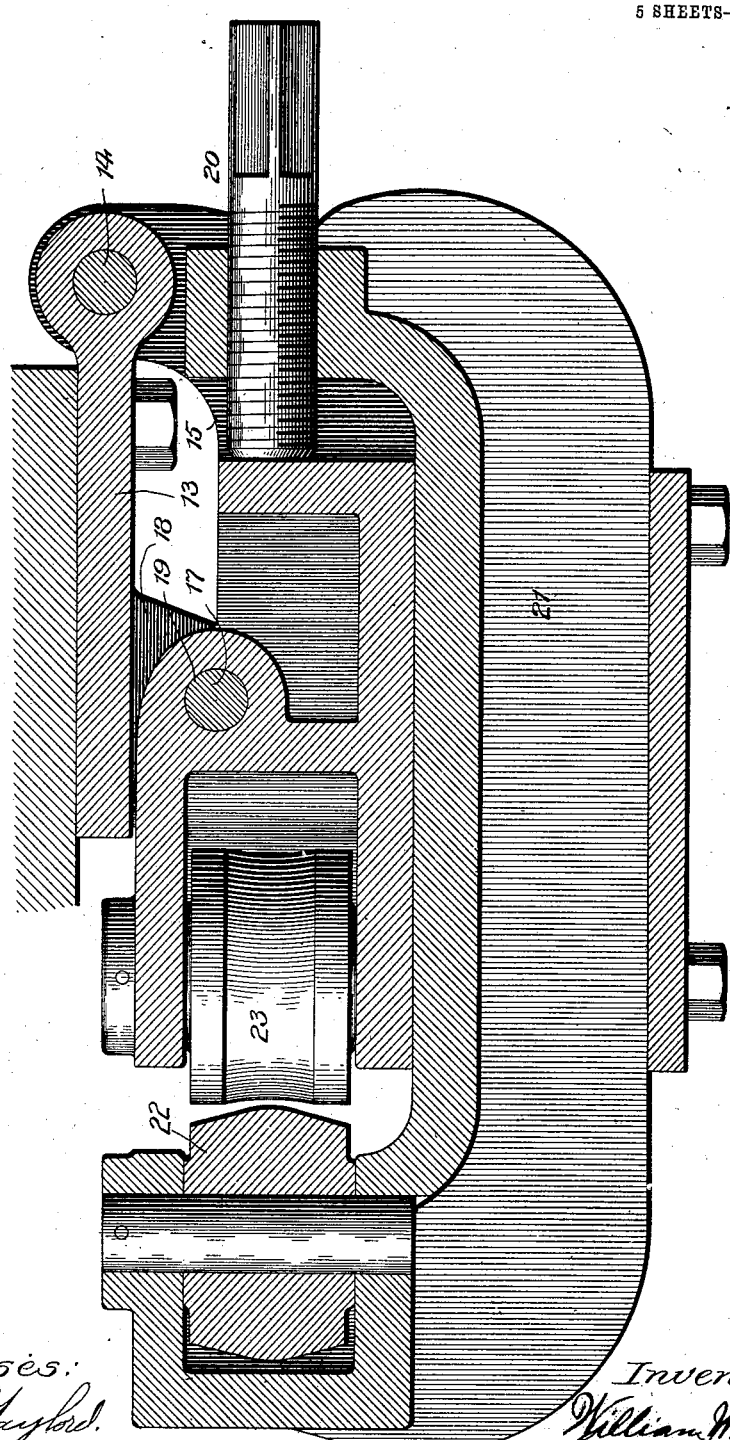
Figure 6:
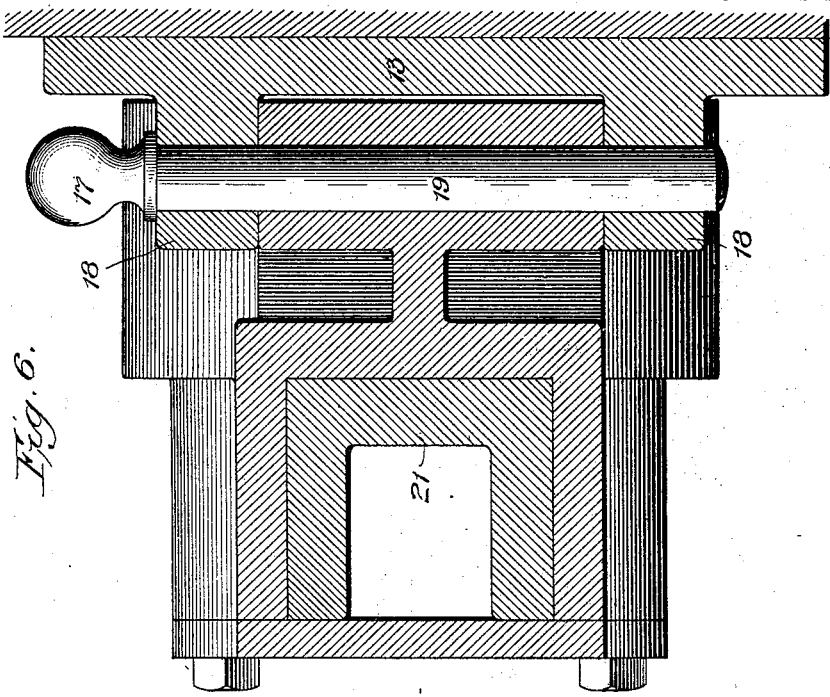
Figure 5:
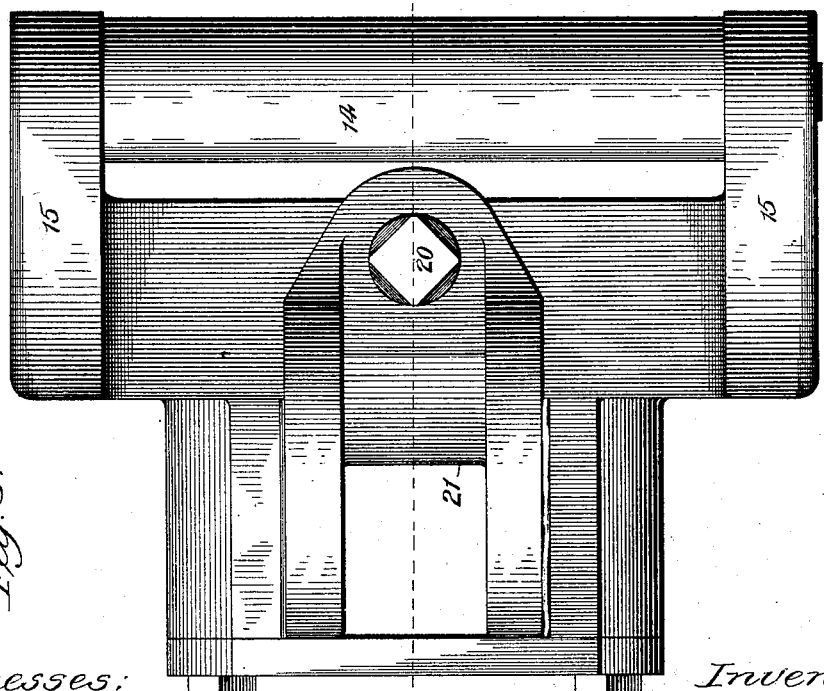

Figure 1 is an elevation showing the end of a tube in position in a threading-machine to which my improvement has been applied. Fig. 2 is a partial plan view of my improved mechanism. Fig. 3 is a vertical section taken on the line 3 of Fig. 2. Fig. 4 is a sectional view taken on a horizontal plane, indicated by the line 4 at Fig. 5. Fig. 5 is an end elevation of the mechanism, and Fig. 6 is a sectional view taken on the line 6 of Fig. 2.

Referring more particularly to Figs. 1 and 2 of the accompanying drawings, it will be seen that upon a bed 7 of a threading-machine or other like piece of mechanism I have shown mounted a frame 8, carrying a pair of jaws 9, movable radially with reference to the center of the pipe and horizontally with reference to the frame, and a vertically-movable cutting or threading tool 10, constructed to be reciprocated by means of the handle 11 and spindle 12.

Upon one side of the frame 8, which carries the gripping-jaws 9, there is a pivotal supporting-bracket 13, upon which by the stem 14 is pivotally carried a frame 15, arranged to move in a horizontal plane about the pivot 14, so as to be swung around to the side of the machine and out of the way of the tube 16 when the latter is put into place or when the truing device is not to be used and to be swung into operative position, as shown in Fig. 2, and locked in such position by means of the pin 17 engaging with the projections 18 on the bracket 13. The pin 17 passes through an opening 19, formed in the swinging frame 15, (see Fig. 4,) thus firmly securing the frame in operative position, as shown in said Fig. 2.

Slidably mounted in the frame 15 and adjustable relative thereto in one direction by means of an adjusting-screw 20 is a sliding piece 21, carrying in its outer end a roller 22, which is opposite a pair of rollers 23, carried by the frame 15, the rollers 22 and 23 being located so that the tube or pipe can be put between them and subjected to the pressure thereof through the instrumentality of the screw 20 as the tube is being revolved by means of the machine.

The rollers 23, mounted in the frame 15, are arranged in pairs one above the other, the roller 22 being mounted on a plane between the rollers 23, so that the three rollers will engage the tube or pipe 16 in the manner shown in Fig. 3.

The operation of my invention is as follows: The locking-pin 17 having been removed and the rollers carried by the arm which is composed of the frame 15 and the extensible piece 21 being swung outward around the pivotal support 14 out of the way, the tube is put in position in the machine and fastened by suitable chucking devices, (not shown,) the gripping-jaws 9 being brought up against the end of the tube to guide it and hold it in proper position. The arm carrying the rollers is now swung around into operative position, as shown in Figs. 1 and 3, the end of the tube projecting between the rollers 22 and 23 and the tube then caused to revolve, the adjusting-screw 20 being gradually tightened by some suitable wrench until the pipe at its end runs perfectly true and has been slightly shaped into a form somewhat resembling a cone by the contour-line of the rollers, as shown in Figs. 2 and 4. The surface of the rollers 23 being concaved and that of the roller 22 convexed produces, as it were, a kind of beading action on the end of the pipe, running the extreme edge inwardly and forming thereon a surface most readily engaged by the threading-dies and this operation being accomplished without the use of any cutting-tools such as have been heretofore used.

Having thus described my invention, what I claim as new, and desire to secure by Letters Patent, is—

1. A pipe-truing machine, comprising a set of truing-rollers, an arm carrying said rollers, composed of two parts longitudinally movable relative to each other, and a pivotal support for said arm, whereby the same may be swung out of operative position when desired, substantially as described.

2. A pipe-truing machine comprising a pair of rollers mounted in position to engage the outside of a pipe, a single roller mounted to bear upon the inside of the pipe, a supporting-frame for said rollers open at one side thereof and being pivotally mounted to swing the rollers into engagement with the pipe, said roller-supports being provided with means to reciprocate the rollers to and from each other.

3. A pipe-truing machine, comprising a frame, a pair of rollers carried thereby, a roller mounted to reciprocate relative to said first-mentioned rollers, and an extension-piece carried by said frame, supporting said last-mentioned roller, and means for moving said extension-piece relative to said frame, substantially as described.

4. A pipe-truing machine, comprising a pair of rollers carried by a pivotally-mounted frame, a third roller carried in a longitudinal extension of said frame, and a locking device for holding said frame in operative position, and permitting the same to be swung out of operative position, substantially as described.

5. A pipe-truing machine comprising a pair of rollers mounted in position to engage the outside of a pipe to be operated upon, a single roller mounted on a sliding jaw to bear upon the inside of the pipe between the two first-mentioned rollers, a supporting-frame for said rollers, open at one side whereby to permit entry of the end of the pipe between the rollers and from one side of said frame, and means for forcibly drawing the pair of outer rollers, and the inner roller toward each other, substantially as described.

In testimony whereof I have hereunto set my hand in the presence of two subscribing witnesses.

WILLIAM W. DOOLITTLE.

In presence of—
PAUL SYNNESTVEDT,
PAUL CARPENTER.